United States Patent
Fischer et al.

(10) Patent No.: US 10,071,528 B2
(45) Date of Patent: Sep. 11, 2018

(54) STIFFENED THIN-WALLED FIBRE COMPOSITE PRODUCTS AND METHOD OF MAKING SAME

(75) Inventors: Christian Fischer, Lausanne (CH); Julien Rion, Romont (CH)

(73) Assignee: Bcomp SA (CH)

(*) Notice: Subject to any disclaimer, the term of this patent is extended or adjusted under 35 U.S.C. 154(b) by 890 days.

(21) Appl. No.: 13/992,382

(22) PCT Filed: Nov. 16, 2011

(86) PCT No.: PCT/EP2011/070278
§ 371 (c)(1),
(2), (4) Date: Aug. 19, 2013

(87) PCT Pub. No.: WO2012/076308
PCT Pub. Date: Jun. 14, 2012

(65) Prior Publication Data
US 2013/0344266 A1    Dec. 26, 2013

(30) Foreign Application Priority Data

Dec. 8, 2010  (WO) .................. PCT/IB2010/055660

(51) Int. Cl.
*B29C 70/02* (2006.01)
*B29K 311/10* (2006.01)
(Continued)

(52) U.S. Cl.
CPC ............ *B29C 70/021* (2013.01); *B29C 70/08* (2013.01); *B29C 70/20* (2013.01); *B29C 70/202* (2013.01);
(Continued)

(58) Field of Classification Search
CPC ....... B29C 70/021; B29C 70/08; B29C 70/20; B29C 70/202; B29C 70/443;
(Continued)

(56) References Cited

U.S. PATENT DOCUMENTS 2,621,684 A * 12/1952 Love ..................... D03D 23/00
139/391
3,972,529 A     8/1976 McNeil
(Continued)

FOREIGN PATENT DOCUMENTS

EP        0436391 A2     7/1991
WO   WO2005/033390   *  4/2005
(Continued)

OTHER PUBLICATIONS

H. L. Bos et al., "Tensile and Compressive Properties of Flax Fibres for Natural Fibre Reinforced Composites," Journal of Materials Sciences, 2002, vol. 37, pp. 1863-1692.
(Continued)

*Primary Examiner* — Yan Lan
(74) *Attorney, Agent, or Firm* — Blank Rome LLP

(57) ABSTRACT

Stiffened thin-walled natural fiber composite product having first fiber yarns (A), each first fiber having a first thickness, and second fiber yarns (B) having a second thickness larger than the first thickness. At least one side of said product is even. Applications for a seat post; a bicycle saddle; a bicycle frame; a bicycle handle bar; a baseball bat; a piece of furniture; a paddle; or a sheet for automotive applications.

30 Claims, 20 Drawing Sheets

(51) Int. Cl.
  *B29D 7/00* (2006.01)
  *B29D 23/00* (2006.01)
  *B29C 70/08* (2006.01)
  *B29C 70/20* (2006.01)
  *B29C 70/44* (2006.01)
  *B29D 99/00* (2010.01)

(52) U.S. Cl.
  CPC ........ *B29C 70/443* (2013.01); *B29D 99/0014* (2013.01); *B29K 2311/10* (2013.01); *Y10T 428/1348* (2015.01); *Y10T 428/24612* (2015.01)

(58) Field of Classification Search
  CPC ........... B29D 99/0014; Y10T 428/1348; Y10T 428/24612; B29K 2311/10
  USPC .................................. 264/258; 428/172, 35.6
  See application file for complete search history.

(56) References Cited

U.S. PATENT DOCUMENTS

| | | | |
|---|---|---|---|
| 4,067,362 | A | 1/1978 | Jackman |
| 4,456,034 | A | 6/1984 | Bixby |
| 5,176,868 | A | 1/1993 | Davis |
| 5,209,136 | A | 5/1993 | Williams |
| 5,451,377 | A | 9/1995 | Asher et al. |
| 5,549,968 | A * | 8/1996 | Byers ..................... B32B 5/26 101/376 |
| 5,771,680 | A | 6/1998 | Zahedi et al. |
| 5,803,476 | A | 9/1998 | Olson et al. |
| 5,853,651 | A | 12/1998 | Lindsay et al. |
| 6,110,567 | A | 8/2000 | Bird |
| 6,129,962 | A | 10/2000 | Quigley et al. |
| 6,503,856 | B1 | 1/2003 | Broadway et al. |
| 6,613,258 | B1 | 9/2003 | Maison et al. |
| 6,820,654 | B2 | 11/2004 | Lindsay |
| 2006/0233907 | A1 | 10/2006 | Ruiz et al. |
| 2008/0196820 | A1 | 8/2008 | Wagener et al. |
| 2010/0178829 | A1* | 7/2010 | Kulkarni ................. B32B 5/26 442/301 |

FOREIGN PATENT DOCUMENTS

| | | |
|---|---|---|
| WO | WO-2005118263 A1 | 12/2005 |
| WO | WO-2006134271 A1 | 12/2006 |

OTHER PUBLICATIONS

A. K Bledzki et al., "Composites Reinforced with Cellulose Fibres," Progress in Polymer science, 1999, vol. 24, p. 221-274.

K. Charlet et al., "Influence of an Agatha Flax Fibre Location in a Stem on its Mechanical, Chemical and Morphological Properties," Composites Science and Technology, 2009. vol. 69, p. 1399-1403.

J. Gassan, "A Study of Fibre and Interface Parameters Affecting the Fatigue Behaviour of Natural Fibre Composites", Composites: Part A, 2002. vol. 33, p. 369-374.

I. Van De Weyenberg et al., "Influence of Processing and Chemical Treatment of Flax Fibres on their Composites," Composites Science and Technology, 2003, vol. 63, p. 1241-1246.

M. J. John et al., "Chemical Modification of Flax Reinforced Polypropylene Composites," Composites: Part A, 2009, vol. 40, p. 442-448.

F. Marguet et al., "The Natural, Flax and Hemp Vegetation Fibers of Europe: Performances and Added Environmental Value," The European Federation of Flax and Hemp (CELC), Paris, 2009, 8 pages.

A. K. Mohanty et al., "Biofibres, Biodegradable Polymers and Biocomposites: An Overview," Macromolecular Materials and Engineering 2000,276-277: p. 1-24.

C. Baley et al., "Recycling Composite Materials Reinforced with Plant Fibres", JEC magazine, 2010, vol. 55, p. 37-38.

L. Ye et al , "Consolidation of GF / PP Commingled Yarn Composites," Applied Composite Materials, '1995, vol. 1, p. 415-429.

N. Bernet et al., "Commingled Yarn Composites for Rapid Processing of Complex Shapes", Composites: Part A, 2001, vol. 32: p. 1613-1626.

* cited by examiner

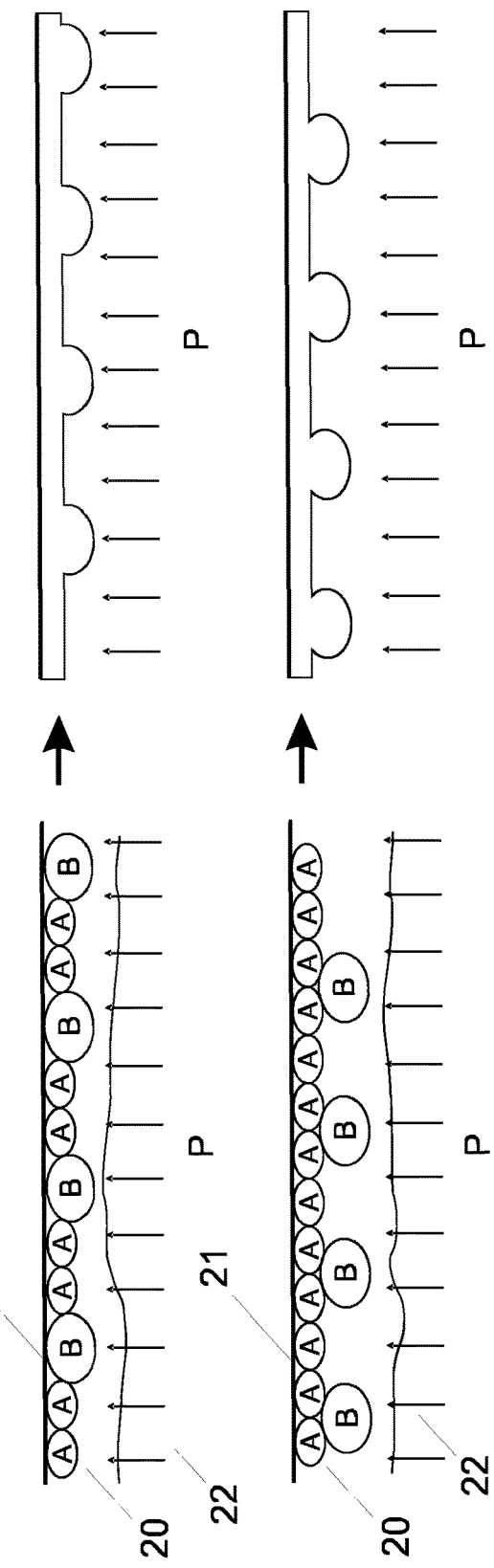

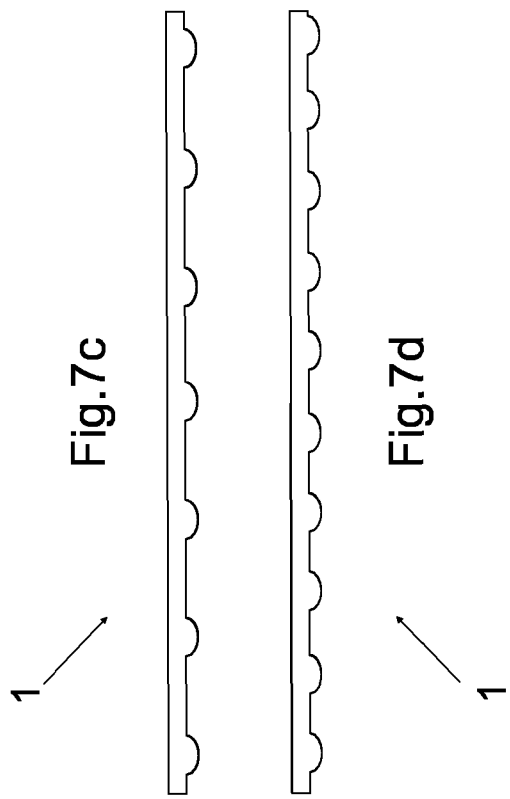
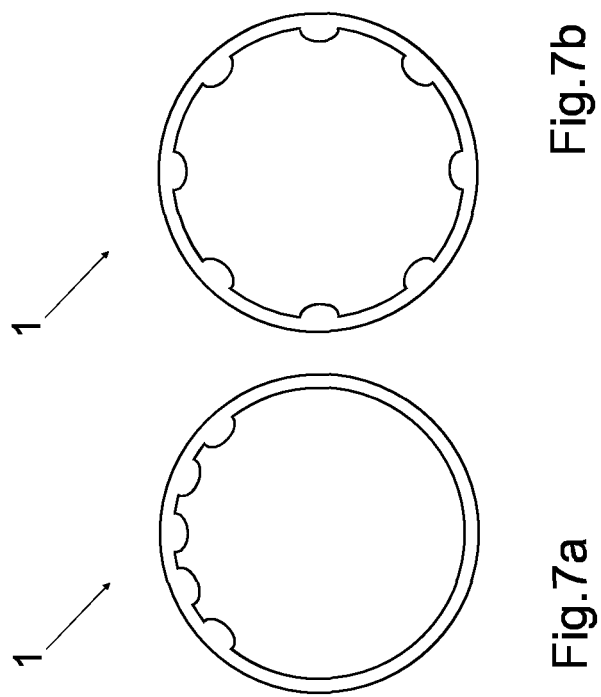

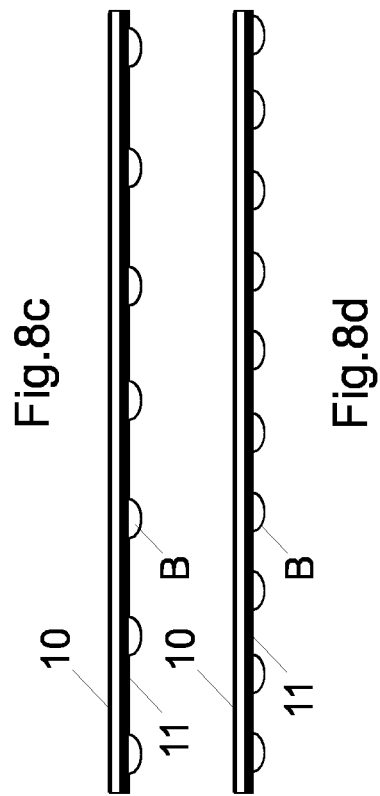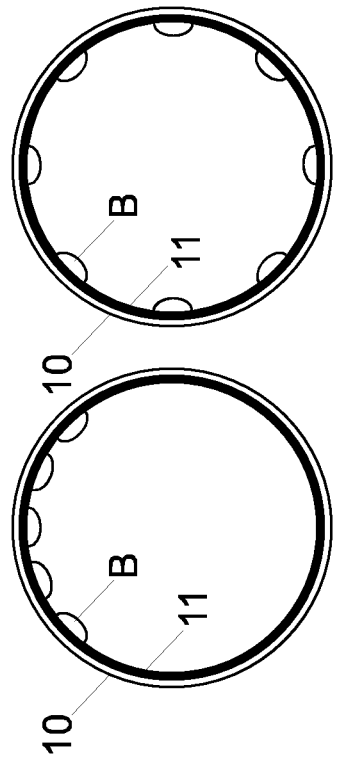

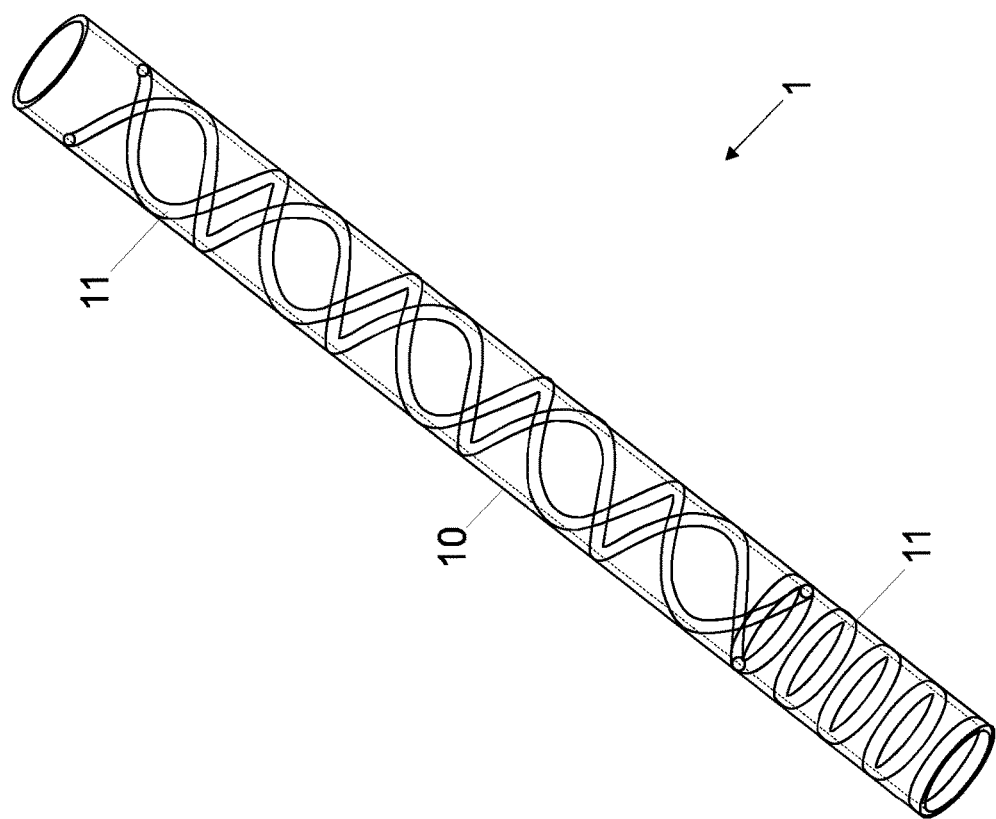

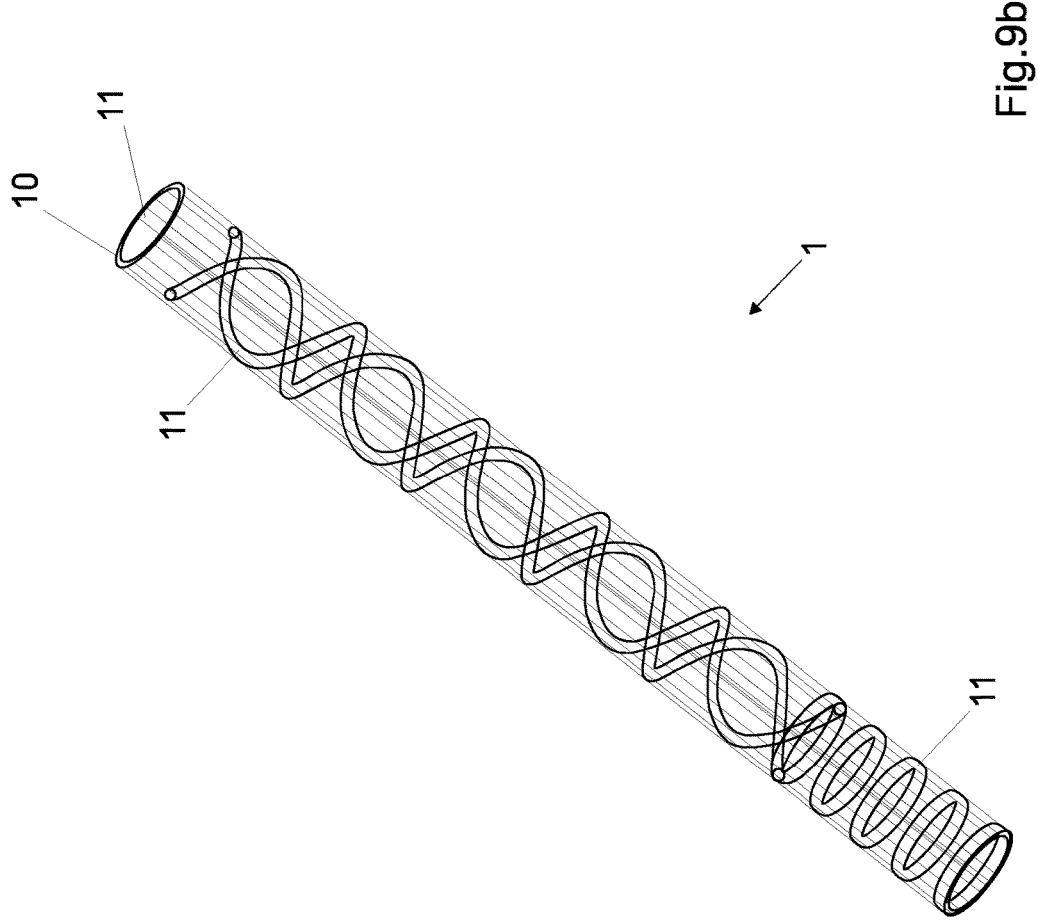

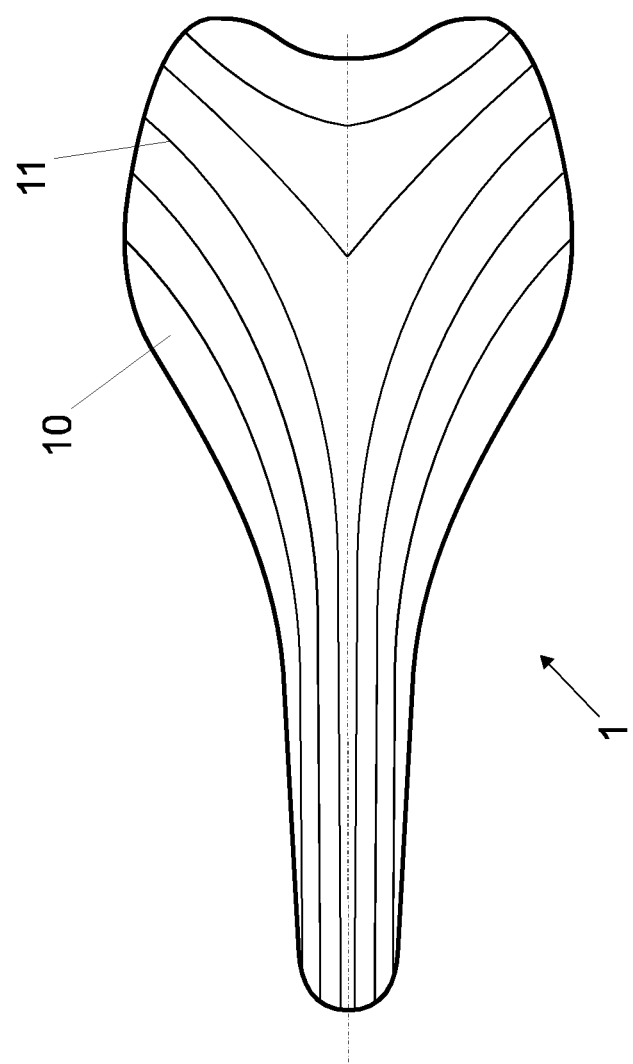

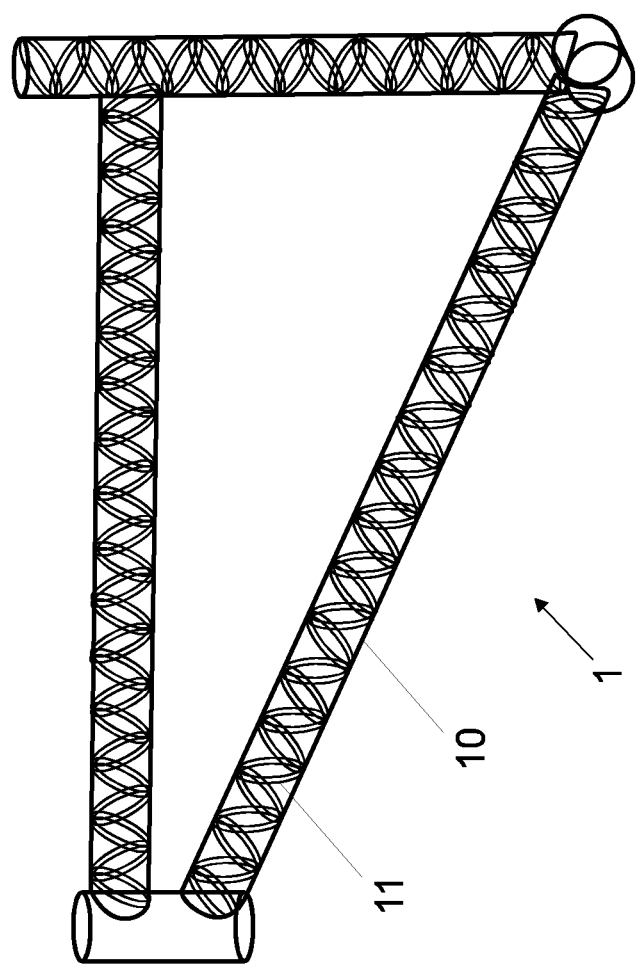

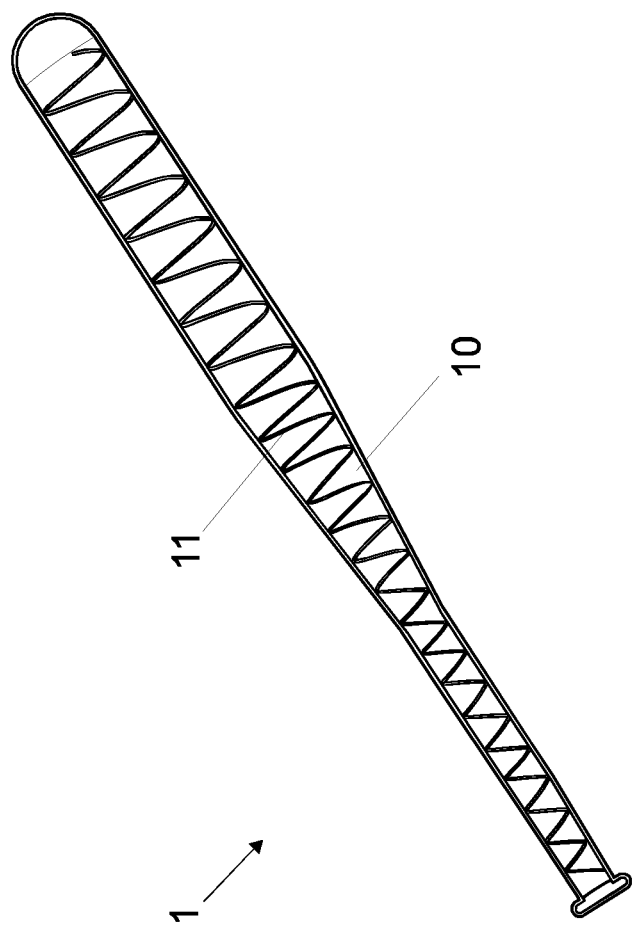

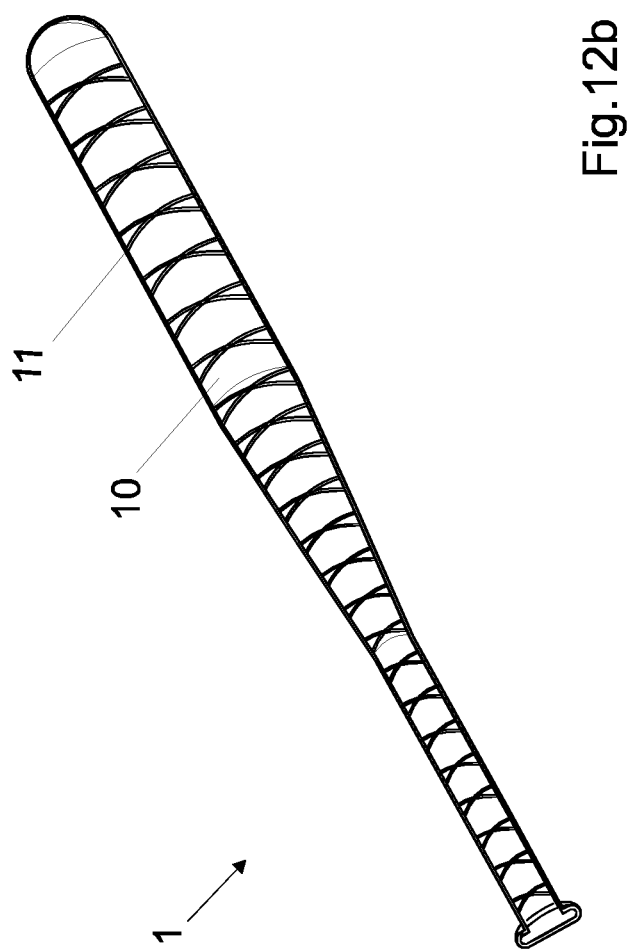

STIFFENED THIN-WALLED FIBRE COMPOSITE PRODUCTS AND METHOD OF MAKING SAME

RELATED APPLICATIONS

This application is a National Phase of PCT/EP2011/070278, which claims the priority of International Application PCT/IB2010/055660, filed on Dec. 8, 2010, the contents of which are incorporated here by reference.

FIELD OF THE INVENTION

The present invention relates to natural fibre composite products and to a method for manufacturing them.

The present invention relates in particular to products such as, without limitations, a seat post; a bicycle saddle; a bicycle frame; a bicycle handle bar; a baseball bat; a piece of furniture; a paddle; or a sheet for automotive applications.

DESCRIPTION OF RELATED ART

Stiffening of Thin-Walled Composite Structures

Stiffeners in form of ribs or webs have been used in hollow composite parts for many years in a large variety of applications. At the macro-scale, one of the most common examples consists of the wings and fuselages of airplanes. Examples of technologies for stiffening aerospace structures have been disclosed in U.S. Pat. No. 6,613,258, in U.S. Pat. No. 5,451,377, in U.S. Pat. No. 5,771,680 and in U.S. Pat. No. 6,110,567. At a smaller scale, various approaches have been developed to improve the buckling resistance of thin-walled composite structures. U.S. Pat. No. 4,067,362 discloses a way to obtaining reinforced tubular structures with ribs helicoidally arranged on the outer surface of the tube, while U.S. Pat. No. 3,972,529 suggests reinforcing metal tubes with wall sections of unidirectional carbon fibres to reinforce the metal wall. Another method of stiffening hollow structures consists of adding shear webs within the empty space, as disclosed in U.S. Pat. No. 6,129,962.

More recently, U.S. Pat. No. 5,853,651 discloses a method using bladder inflation moulding to locally reinforce the walls of bicycles frames with small tubular structures inside the main frame, resulting in a multi-tubular structure. Also, several inventions present solutions to prevent the collapse of flexible tubes, such as hoses in car engines (U.S. Pat. No. 4,456,034) or pressurized cables in deviated wells (U.S. Pat. No. 5,209,136).

A method for producing helicoidally running carbon ribs on the inner or outer surface of a tube is disclosed in U.S. Pat. No. 6,820,654. However, when compared to the standard bladder inflation moulding (BIM) processing technique, it implies two supplementary steps, namely (i) the preparation of the grooves on the bladder surface, and (ii) placing carbon fibre yarns into these grooves by hand. In addition, this method is limited to ribs made from carbon fibres for tubular structures, and does not include flat or curved surfaces.

Biocomposites

Composite materials have been in use, in particular for aeronautic and space applications, for the past 40 years mostly thanks to their high specific mechanical properties. Since then, the field of composite materials research has evolved from the initial search for very high specific properties alone, driven by aerospace application, to the need to maintain high properties while reducing manufacturing time and production costs, driven by automotive and other large scale applications, to recently include the need to integrate added functionality in the composite part. In recent years, composites made from natural fibres have received increasing attention in light of the growing environmental awareness. Due to their low cost, low environmental impact, and relatively high specific mechanical properties, natural fibres are emerging as a new alternative to glass fibres as a reinforcement in composites, as disclosed by Bos, H. L: et al in "Tensile and compressive properties of flax fibres for natural fibre reinforced composites", Journal of materials sciences, 2002, Vol. 37, pp. 1863-1692. Due to inhomogeneous fibre properties, poor adhesion between fibre and matrix (poor wettability by non-polar plastics), moisture sensitivity, as well as poor flame retardant properties in some cases, an extensive use of natural fibre-based composites was impossible until recently, as described by Bledzki, A. K. et al. in "Composites reinforced with cellulose fibres", Progress in Polymer science, 1999, Vol. 24, p. 221-274.

However, significant research effort has been pursued in recent years to improve the characteristics and properties of various types of natural fibres. Areas of improvement include the selection of fibres for a better homogenization of their properties (Charlet, K., et al., "Influence of an Agatha flax fibre location in a stem on its mechanical, chemical and morphological properties", Composites Science and Technology, 2009. Vol. 69, p. 1399-1403), and the development of surface treatments to significantly increase fibre-matrix interfacial strength (Gassan, J. in "A study of fibre and interface parameters affecting the fatigue behaviour of natural fibre composites", Composites: Part A, 2002. Vol. 33, p. 369-374; Van de Weyenberg, I., et al. in "Influence of processing and chemical treatment of flax fibres on their composites in Composites Science and Technology", 2003, Vol. 63, p. 1241-1246, and John, M. J. et al. in "Chemical modification of flax reinforced polypropylene composites", Composites: Part A, 2009, Vol. 40, p. 442-448). This leads to the use of natural fibre composites in an increasing variety of applications. With their excellent damping properties, they start being used in tennis rackets and high-performance bicycle frames (Marguet, F. et al. in "The natural, flax and hemp vegetation fibers of Europe: performances and added environmental value", 2009, The European Federation of Flax and Hemp (CELC), Paris), and due to the increasing pressure on the automotive industry to significantly increase material recyclability, bio-composites are expected to play an important role in the future of this industry. This trend is currently being confirmed by the increasing use of such materials in non-structural car parts of car interiors.

So far, several types of bio-based fibres have been extracted and characterized, such as flax, hemp, jute, ramie, kenaf, sisal, henequen, bamboo, silk, or cotton, as disclosed in Mohanty, A. K. et al. in "Biofibres, biodegradable polymers and biocomposites: An overview", Macromolecular Materials and Engineering 2000, 276/277: p. 1-24. Currently, flax and hemp fibres appear to be amongst the most promising, due to their combination of high specific mechanical properties, availability, low energy-use in production, low amount of plant care under growth, little need for irrigation, and zero carbon footprint when considering the entire fibre life cycle. In addition to outperforming glass fibres regarding their specific stiffness, flax fibres have been reported to have outstanding damping properties, and the energy required to produce 1 kg of flax fibre mat is only ⅙ of the glass fibre-, and 1/13 of the carbon fibre equivalent.

When a biodegradable material (neat polymer, blended product, or composite) is obtained completely from renewable resources it is typically known as a biopolymer. Biopolymers from renewable resources have attracted much attention in recent years. Renewable sources of polymeric materials offer an answer to maintaining sustainable development of economically and ecologically attractive technology. The innovations in the development of materials from biopolymers, the preservation of fossil-based raw materials, complete biological degradability, the reduction in the volume of garbage and compostability in the natural cycle, protection of the climate through the reduction of carbon dioxide released, as well as the application possibilities of agricultural resources for the production of bio/green materials are some of the reasons why such materials have attracted the public interest. However, an alternative approach for designing sustainable composites is the use of traditional thermoplastic polymers, and making sure that they are recycled after their first service life.

Traditional thermoplastic polymers such as Poly(propylene) have shown to be well suited for reuse by means of recycling steps. In combination with natural fibres such as hemp, the mechanical properties remained relatively constant from one recycling step to the other (Baley, C. et al., "Recycling composite materials reinforced with plant fibres", JEC magazine, 2010, Vol. 55, p. 37-38).

Composites Made from Thermoplastic Commingled Yarn Fabrics

Composites made from thermoplastic commingled yarn fabrics have been described in Ye, L., K. Friedrich et al. in "Consolidation of GF/PP commingled yarn composites", Applied Composite Materials, 1995, Vol. 1, p. 415-429.

The potential of braided commingled performs in conjunction with bladder-inflation moulding to produce complex hollow shapes has been demonstrated by Bernet, N., et al., "Commingled yarn composites for rapid processing of complex shapes", Composites: Part A, 2001, Vol. 32: p. 1613-1626, and in U.S. Pat. No. 5,176,868 and U.S. Pat. No. 5,803,476.

Composites Made from Pre-Impregnated Noncrimp Fabrics

In traditional noncrimp fabrics, yarns are placed parallel to each other in separate layers of identical or different orientations. When impregnated with a thermoset resin such as epoxy, the resulting product is known as a "prepreg", which is a term for "pre-impregnated" composite fibres. These may either take the form of a weave or are unidirectional. As a result of the impregnation step, they already contain an amount of the matrix material used to bond them together and to other components during manufacture. The prepregs are mostly stored in cooled areas since activation is most commonly done by heat. Hence, composite structures built of prepregs will mostly require an oven or autoclave to cure out. However, prepregs exist which may be cured at ambient temperature.

BRIEF SUMMARY OF THE INVENTION

According to one aspect of the invention, a new stiffened thin-walled natural fibre composite product is proposed which comprises:
    first fibre yarns (A), each first fibre yarn having a first thickness, and
    second fibre yarns (B) having a second thickness larger than said first thickness,
    wherein at least one side of said product is even.

This has the advantage of using natural fibres both as main material for the fabric, and thicker yarns of natural fibres as stiffeners for reinforcing the product. This also has the advantage that at least one of the side of the product is even (flat), resulting in an easier to use product, such that the stiffeners are only on the other side of the product.

It has been found within the framework of the invention that despite their specific stiffness properties being similar to those of aluminium alloys, the absolute tensile modulus of flax fibre composites is approx. half the Al value. Thus, thin-walled structures (e.g. tubes) are more sensitive to local failure phenomena like face buckling or cross-sectional collapse, which is further increased by the thickness discontinuities and other imperfections at micro-level of the natural fibres.

Therefore, according to one aspect of the invention, such thin-walled structures are reinforced with so-called ribs or stiffeners at the meso-level, such to locally increase the wall's static height and thus its stiffness.

It has also been found that natural fibres being limited in length by nature, they are processed into yarns by a spinning process, introducing a certain amount of twist into the yarns. When exposed to pressure perpendicular to their direction, yarns will have the tendency to maintain their round cross-section, while synthetic (e.g. glass or carbon) fibre based yarns flatten out due to a disassembly of the fibres constituting the yarns. Therefore, according to one aspect, the limited compressibility of natural fibre yarns with specific composite processing methods is used to design reinforced thin-walled structures with meso-scale ribs, which are tailorable in thickness, direction and density. Flexural stiffness of plates and flexural strength of tubes are significantly increased, while very little weight is added vs. the same structures designed without the present technology.

Experimental testing and analytical models have shown that adding 10% weight of criss-crossing ribs increases the torsional stiffness of flat structures and the resistance to cross-sectional collapse of tubes by up to 300%, and 5% weight of parallel ribs increases the flexural stiffness of a plate by up to 250%.

The present invention allows designing stiffeners on one side of the structure, being it on the inside of a tubular structure, or on one side of a flat or curved surface. The other side (for example the external side of a tube) is preferably even; this is achieved by having all stiffeners stitched or glued on the same uneven side of the fabric. In another embodiment, the even side is achieved by overlaying another even layer of natural fibre composite product over the stiffeners. In yet another embodiment, the even side is achieved by pressing and hardening the polymer or resin of the composite product against an even surface of a mould.

Products embodied in the present invention can be made using manufacturing technologies using at least one flexible mould side, using methods such as bladder inflation moulding (BIM) for tubes, or any type of method including a flexible membrane or film (silicon, plastic, rubber etc.), such as any type of vacuum moulding. In another embodiment, products according to some embodiments of the invention are manufactured with the process described in US2006/0233907, to obtain flat or curved shapes. However, in the case of flat or curved shapes, both sides of the mould may be stiff (e.g. metallic), where one mould surface has grooves machined onto, corresponding to the negative of the corresponding ribs of the resulting composite part.

According to one aspect, a method for obtaining ribs on one side of a surface or tube uses a specifically designed fibre fabric as a preform. On one face, the preform is made from an indefinite amount of fibre layers, a fabric which may or may not be non-crimp fabric, such to fulfil the structural requirements of the final part. On the other face, however, at least one fibre layer is characterized by containing fibre yarns of at least two different thicknesses, such that the thicker yarns stick out from the surface, the said surface being uneven in the sense that is has a wavy appearance. An alternative of the present invention consists of adding spaced yarns onto a base fabric, with again the result of a wavy surface. This second version of the invention typically leads to a more pronounced thickness difference from one fabric point to the other than the first version. Both are part of this invention, and may be used in applications where best suited, respectively.

This method may advantageously be used for so-called thin-walled parts, in order to locally increase the wall stiffness, thus increasing the local resistance to buckling of the walls. This phenomenon typically occurs in structural parts which are designed to meet stiffness requirements, and where the high mechanical performance of the load-bearing material only requires thin layers of the material in order to meet the stiffness requirements for the final part. Additional layers of either the same or a different material are generally added to significantly decrease the likelihood for local instability leading to buckling failure. Thus, additional weight is added to the part, which in addition may result in over-engineering the stiffness of the part. Local buckling may occur both in hollow structures such as tubes, as well as flat sheets and single- or double curved surfaces. Thus, the present invention applies to any of these shapes made from fibre composites.

When exposed to bending or torsion loads, tubular structures may either fail because the tensile or compression strength in the wall material is exceeded, because of buckling of the wall due to local instability as described in the above paragraph, or because of collapse of the cross-section. The latter may also be prevented by the present invention, by placing stiffeners running helicoidally or circumferentially inside the tube wall.

BRIEF DESCRIPTION OF THE DRAWINGS

The invention will be better understood with the aid of the description of an embodiment given by way of example and illustrated by the figures, in which:

FIG. 1 shows three different examples of fibre composite tubes with stiffeners on their interior tube wall, respectively.

FIG. 4 shows a schematic transversal cut of noncrimp fabrics arranged in a tubular shape.

FIG. 6 schematically shows some steps of a processing and consolidation method for producing a flat or curved surface.

FIG. 7 shows examples of fibre composite tubes and sheets obtained with the method of the invention.

FIG. 8 shows examples of fibre composite tubes and sheets obtained from the disclosed technology, combining at least two different types of fibre materials.

FIGS. 9a to 9b illustrate examples of a bicycle seat post according to the invention.

FIG. 10 illustrates an example of bicycle saddle according to the invention.

FIG. 11 illustrates an example of bicycle frame according to the invention.

FIGS. 12a to 12b illustrate examples of baseball bats according to the invention.

DETAILED DESCRIPTION OF POSSIBLE EMBODIMENTS OF THE INVENTION

Figures 1A, 1B, 1C:
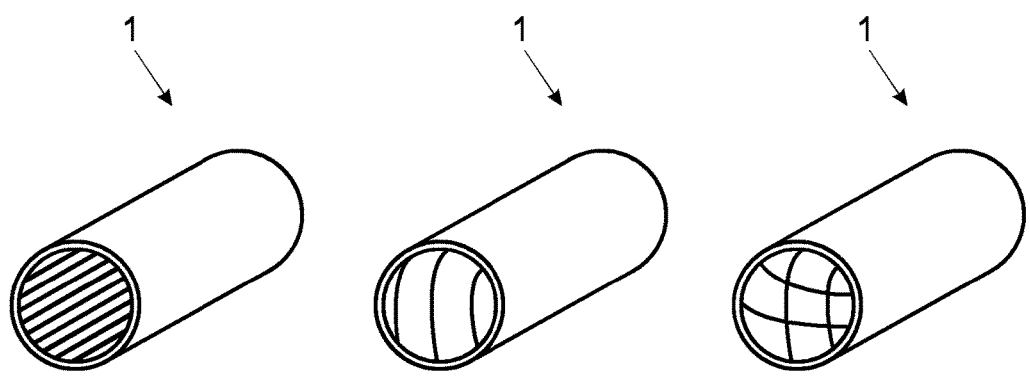
In FIG. 1a the stiffeners inside the tube run along the tube axis.
In FIG. 1b the stiffeners run helicoidally in one single direction.
In FIG. 1c the stiffeners run helicoidally in two opposite directions (in this example ±45°).

FIG. 1 displays examples of composite tubes with longitudinal stiffeners (FIG. 1a), unidirectional stiffeners running helicoidally (1b), and bi-directional stiffeners running helicoidally (1c), all on the inside of the tube wall. The external side of the tube is preferably even. Typical dimension of a tube included in the present invention would range from some millimeters to centimeters for the tube diameter, and some tenths of millimeters to some millimeters wall thickness. The stiffeners are spaced by some tenths of millimeters to several millimeters, and are some tenths of millimeters to several millimeters thick.

Figure 2A:
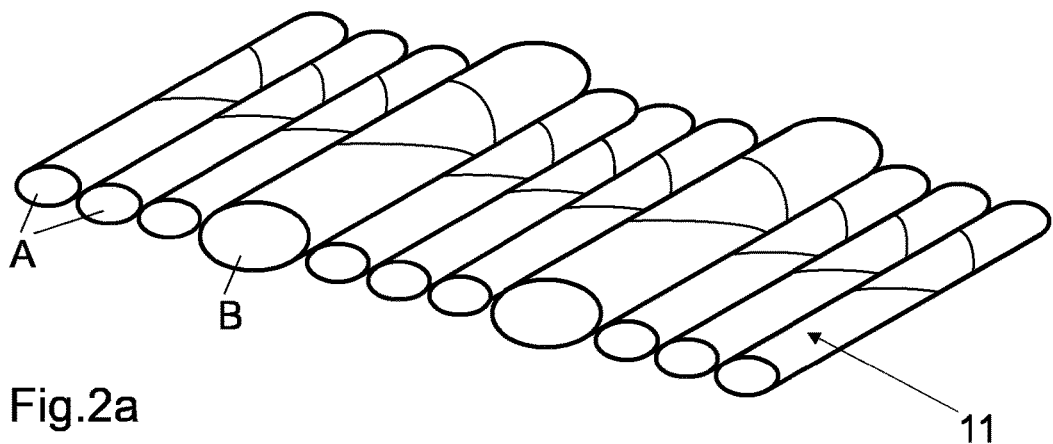
FIG. 2 shows schematic of noncrimp fabric with two different yarn diameters.
Figure 2B:
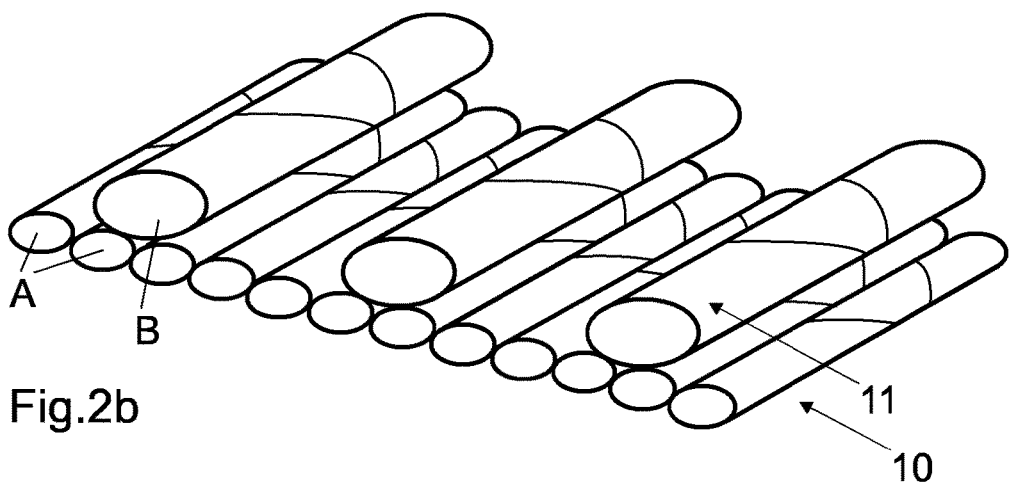
Figure 2C:
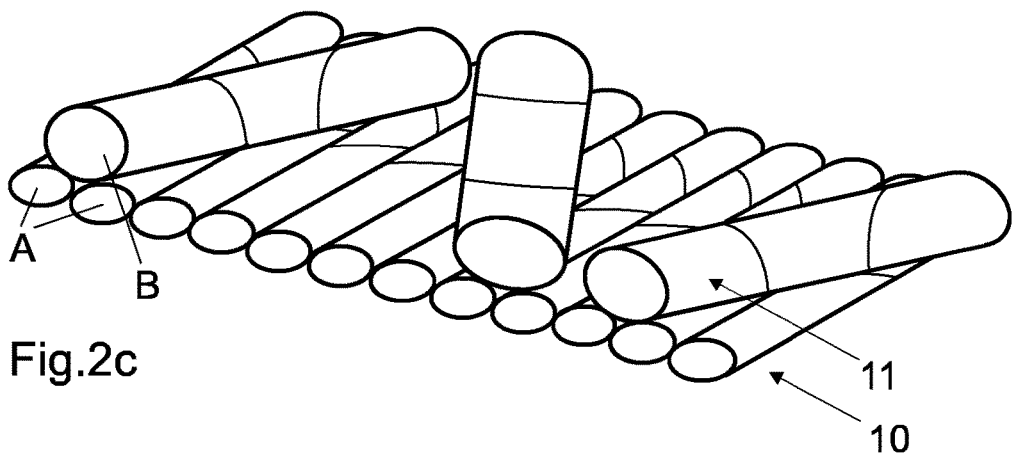

FIGS. 2a to 2c show schematics of noncrimp fabric according to the current invention, incorporating two different yarn diameters. In FIG. 2a, the thicker yarns are stitched into the same yarn layer as the thinner ones, whereas the sequence at which thicker yarns are placed may or may not repeat regularly. This layer has both sides which are uneven; advantageously, it can be fixed on top of a first layer of natural fibre composite in which all fibres have the same diameter, thus providing a stack in which at least the external side corresponding to the first layer is even.

In FIG. 2b, spaced thicker yarns are stitched (or kept in place by other techniques, e.g. glued, adhesive bonding, or directly obtained by weaving, knitting, braiding, or any other known textile manufacturing process) onto a layer of densely aligned thinner yarns. The top layer in FIG. 2b may be made from yarns of equal or superior thickness than the yarns in the base layer. In addition to the yarn diameter, the fibres used in each of the yarns may differ, using for example one type of fibre in the thin yarns, and a second type of fibre in the thicker yarns. The first and the second type of fibre may be selected among flax, hemp, jute, ramie, kenaf, sisal, henequen, bamboo, silk, or cotton. Alternatively, one of the types of fibres may be a non natural type of fibre, such as carbon or glass fibres for example.

The angle of the yarns in the top layer may also vary, such as it is shown in FIG. 2b (parallel to the bottom layer) and FIG. 2c, where the yarns of the top layer cross each other. The angle may vary from any value between 0° (parallel to yarns in the bottom layer) to 90° (perpendicular to yarns in the bottom layer).

Moreover, it is possible to have a fabric comprising fibres of more than two different diameters and/or more than two types, and/or more than two angles.

Figure 2D:
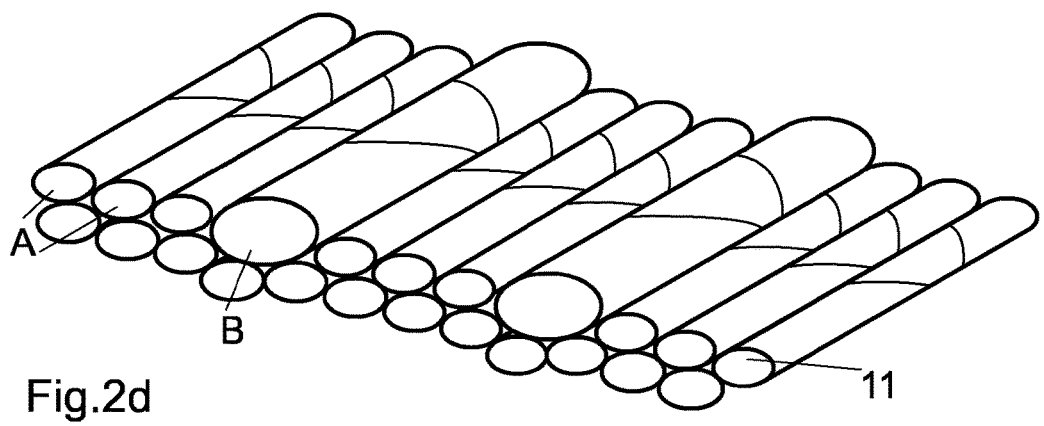

In FIG. 2d, another layer 10 is overlaid over or under an uneven side of the layer 11, thus resulting in a product with at least one side which is even. The additional layer 10 is preferably made of yarns A having all the same diameter; it can be stitched over the uneven layer 11, or glued with the resin or polymer of the composite.

Figure 2E:
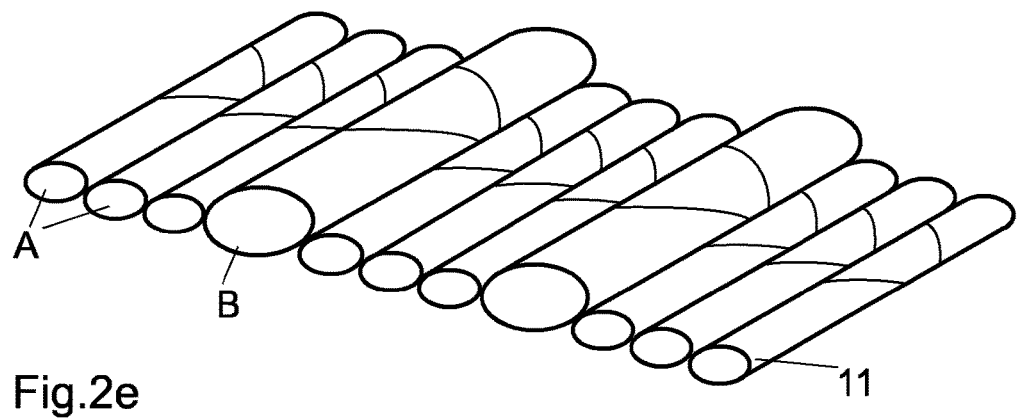

In FIG. 2e, the product comprises one single layer 11 with fibres A of a first diameter and second fibres B having a larger diameter; however, one side (the lower side in this example) comprises fibres A and B which are flush, resulting in an even surface. This even side can be achieved for example by pressing the fabric against the even side of a mould.

Such fabrics are obtained either in one process step, using yarns of one or different thicknesses in conjunction with textile manufacturing equipment, processing the said yarns into the final textile architecture, where some of the yarns are placed such to build the ribs once the textile is processed into the final composite part. Alternatively, one type of yarns or a yarn grid is placed onto a standard weave, a non-crimp fabric made from the same or a different type of yarns, or a fibre mat, and which was made in a prior step. Other methods may be used to obtain such fabrics, such as weaving, knitting, braiding and stitching to make non-crimp fabrics. Alternatively, the yarns can be maintained together by a polymer, either a thermoset resin being cured in subsequent process step or a polymer dissolved or melt prior to impregnation of the tissue with a resin.

The sequence and thickness of the different yarns, respectively, may differ depending on the stiffness requirements of the final part. FIG. 3 displays examples of possible yarn sequences, such as AAABAAABAAA, AABAABAA, ABABABA, AAAABAABAAAA, AABAACAABAAC, where A, B, and C stand for different yarn diameters, and where these sequences may repeat as often as required to fulfil the specific needs of the final part, and where any imaginable sequence of at least two different yarn diameters is included in the present invention. Beyond these examples, other types of combination including non-repetitive sequences, combination of the above sequences, or combinations of more than 2 different yarn types could be used. Beside the thickness, the type of fibres may also vary from one yarn type to the other.

Figure 3A:
FIG. 3 shows examples of yarn thickness sequences in a single yarn layer.
Figure 3B:
Figure 3C:
Figure 3D:
Figure 3E:
Figure 3F:
Figure 3G:
Figure 4D:
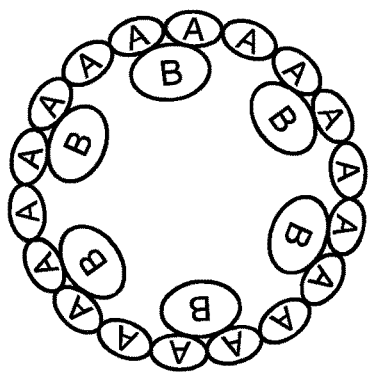
FIGS. 4c and FIG. 4d show tubular preforms obtained when using fabric types shown in FIG. 3f.
Figure 4C:
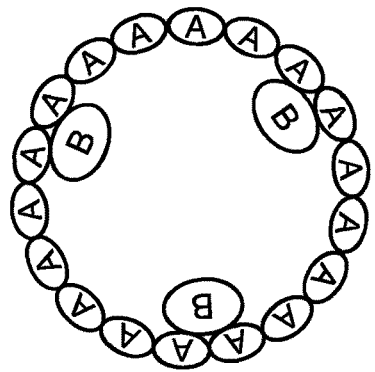
Figure 4B:
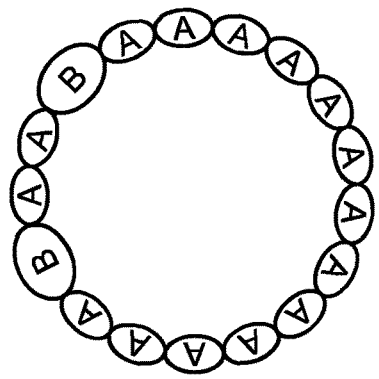
FIG. 4b shows a tube with only two thicker types of yarns at the top of the section.
Figure 4A:
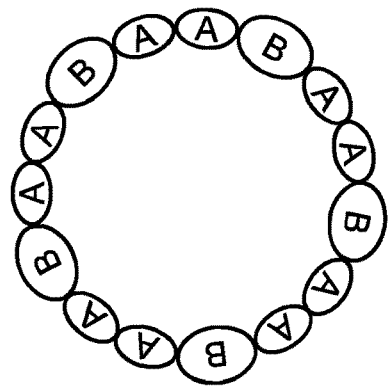
FIG. 4a shows an example of a regular sequence of two types of yarns.
Figure 5D:
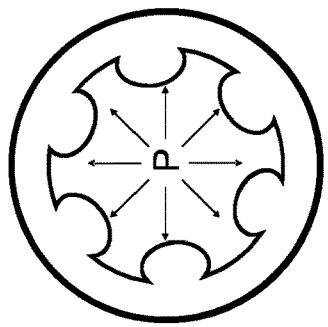
FIG. 5 schematically shows some steps of the processing and consolidation method used for manufacturing a tube.
Figure 5C:
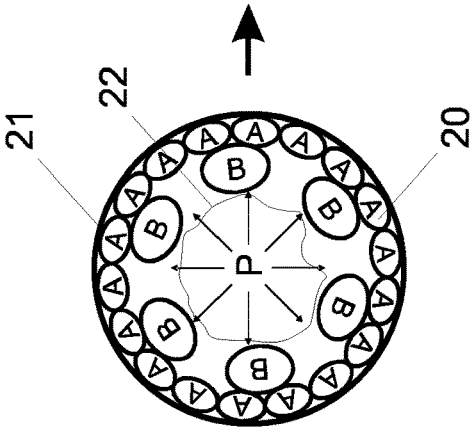
Figure 5B:
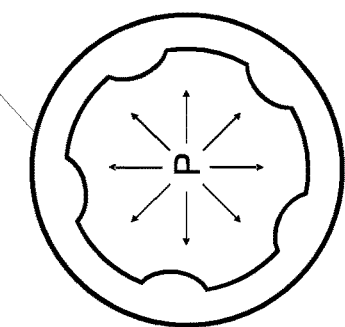
Figure 5A:
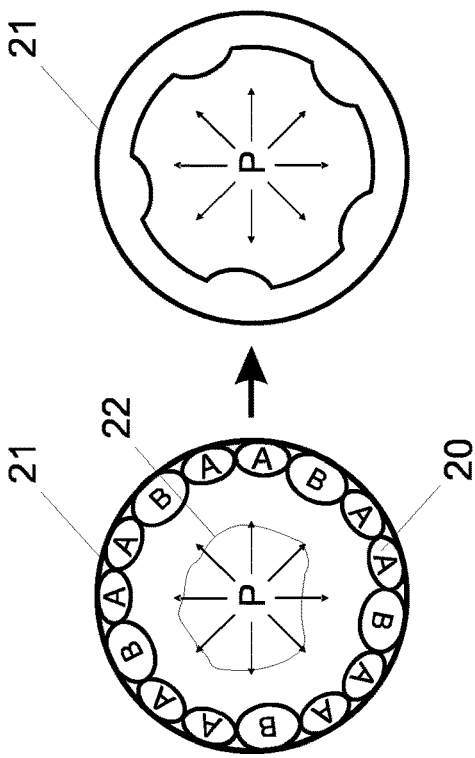

FIG. 3f and FIG. 3g display embodiments where spaced yarns B are stitched or otherwise disposed onto a layer of yarns A of constant thicknesses. The yarns placed at the surface may or may not be different from the yarns composing the base layer, thus the yarns of FIG. 3f could also be of one same type (e.g. all type A or all type B). In addition to fibre material, yarn thickness, space between the said yarns and the regularity of the sequence, the yarn direction may also vary. The second layer is thus made of discontinuous fibre yarns, i.e., fibre yarns which are spatially separated so as to form a grid with space between yarns.

FIG. 4 displays four examples of non-crimp fabric arranged into a tube section. FIG. 4a shows a section made from a repeating sequence based on AABAAB, whereas FIG. 4b only contains two yarns of type B. FIG. 4c and FIG. 4d display tube preforms made from type of fabrics shown in FIG. 3f, i.e., with one layer consisting of spaced yarns B spatially separated from each other. In all cases, additional layers of yarns could be placed outside the tube, increasing the wall thickness of the latter. Also in all cases, the tubular preform can be obtained by using flat layers rolled to form a tube, or directly by processing each layer directly as braided sleeves. For example the perform in FIG. 4d can be produced by putting a braided sleeve of yarn A over a braided sleeve forming a grid of yarn B.

In terms of fibre impregnation and consolidation, different process routes may be applied. In one embodiment of the invention, the tubular fabric, commonly known as the preform 20, may consist of comingled yarns combining both polymer- and reinforcement fibres in the said yarns, whereas the thermoplastic polymer impregnates the surrounding fibres when the temperature is increased above its melting temperature. Alternatively, the thermoplastic polymer can be added in form of powder or layers. In another embodiment of the invention, the yarns are pre-impregnated with a thermoset resin, which solidifies through molecular cross-linking once the temperature is increased. Alternatively, the dry fabric may also be impregnated with a liquid polymer after the fabric has been placed in the mould.

The preform 20 (already containing the polymer or not) is placed inside a rigid female mould 21. In the case where the preform does not yet contain the polymer, impregnation of the fibres is conducted at this stage, using methods such as Resin Transfer Moulding (RTM), Resin Film Infusion (RFI), or Vacuum Injection Moulding, while or after the pressure P on the preform has been increased. Pressure is applied using a flexible bladder 22, which is placed inside the preform 20 and inflated such to press the composite fabric 20 against the hot walls of the female mould 21, the composite/bladder assembly conforming to the mould shape. In the case of the thermoplastic-based commingled yarn, the temperature in the mould is set such to melt the thermoplastic, which impregnates the adjacent reinforcement fibres. When cooling the mould 21, the thermoplastic polymer solidifies, and the rigid composite tube can be removed from the mould. In the case of a thermoset-based composite, temperature is set such to initiate crosslinking of the polymer which leads to solidification, the tube being removed once the solidification is completed. Due to the flexible bladder adapting to the contours locally predetermined by each of the yarns, stiffeners are formed at places of thicker fibre yarns. A schematic of the process and the resulting consolidated sections is shown in FIG. 5a to FIG. 5d.

FIG. 6 shows an illustration of the processing and consolidation steps in case of a flat surface. Similar to the tubular case (FIG. 5), the fabric 20 is pressed against a rigid mould 21. When a dry fabric is used, impregnation with either a thermoplastic or thermoset resin is initiated and performed before, during or right after the pressure increase. The pressure may be applied, using a flexible membrane 22 (which does not need to be an inflatable bladder, although this is possibility) from one side and applying pressure P to it. The flexible membrane conforms to the fabric of variable thickness. The temperature of the mould 21 is then increased to (i) decrease the polymer viscosity and optimize the fibre impregnation, and (ii) consolidate the part through cross-linking of the thermoset resin. In the case of a thermoplastic matrix, the consolidation occurs when the temperature is cooled below the polymer glass transition temperature. The method may also be applied to single- or double curved surfaces.

In the case of flat or curved shapes, both sides of the mould may be stiff (e.g. metallic), where in one embodiment one mould surface contains machined grooves on the surface, corresponding to the negative of the corresponding yarns placed on the surface of the composite preform. The grooves are used as guides to accurately place the preform into the mould, before the mould is closed, and the composite cured as described above.

Examples of fibre composite tubes and sheets 1 obtained from the disclosed technology are presented in FIGS. 7a to 7b. The resulting stiffeners may either be (a) locally placed in certain portions of the tube section, or (b) evenly around the circumference of the tube section, depending on the structural needs and the stiffness requirements of the final part. Examples of different stiffener densities in flat sheets are given in FIGS. 7c and 7d. Factors like the space between the stiffeners, the regularity of the stiffener sequence, the type of fibres used in the stiffeners, and their thickness, may be applied to any shapes, including hollow parts with closed cross-sections, flat sheets, and single- or double curved surfaces. In addition, the stiffeners may run at any angle, and may also cross each other if several directions need to be reinforced. A concrete example of the latter is a tube with stiffeners running at ±45° relative to the longitudinal axis, to increase the resistance to buckling and collapse of the section. All possible variables, namely regularity of the stiffener sequence, distribution of the stiffeners, type of fibres used in the stiffeners, their thickness or even their angle, may be applied to any of the shapes, including tubes, flat sheets, and single- or double curved surfaces.

FIG. 8 show examples of fibre composite tubes and sheets 1 obtained from the disclosed technology, which combine at least two different types of fibre materials. In FIGS. 8a and 8b, the tubes are composed from a first composite material type (10) on the outside, a different material at the tube inside (11), while the stiffeners may either be made from the same material as the outside of the tube (B), or from a third type of composite material. The same applies to flat sheets (FIGS. 8c and 8d), or to any other single or double curved surface. This approach may be used for composite parts having high damping requirements. The outside of the tube may then be made from a material 10 with a storage modulus E' significantly higher than the storage modulus of material 11, which instead has a significantly higher loss modulus E" (thus damping capacity) when compared to material of the external layer 10.

EXAMPLES

Example 1: Bicycle Seat Post

FIGS. 9a and 9b illustrate two embodiments of a product according to the invention. The product 1 in this example is a bicycle seat post (also known as seat pin or saddle pole), i.e., a tube that extends upwards from the bicycle frame to the saddle. The amount extending out of the frame can usually be adjusted, and there is usually a mark that indicates the minimum insertion (or maximum extension). Prior art seat posts are usually made from steel, aluminium, titanium, carbon fibres, or aluminium wrapped in carbon fibres.

The seat post has to withstand compression and bending resulting from the cyclist sitting on the saddle, torsional stresses resulting from the pedaling and the slight rotation it provokes, as well as circumferential compression from the clamping mechanism used to fix the seat post inside the bicycle frame. In addition, it can be used to damp the vibrations transmitted from the bicycle frame to the body of the cyclist.

The cross-section of a seat post made from the technology disclosed herein is similar to the one shown in FIG. 7b, where the outer layer 10 of the tube consists of a laminate (a layup of several layers of lamina) with fibre layers mainly oriented at 0° to resist the compression and bending, some containing fibres oriented at ±45° to withstand the torsion, and some containing fibres oriented at 90° to resist the clamping efforts. The orientation of the inner rib structure 11 varies along the seat post: in the clamping zone, the ribs are annular and oriented at 90° to the seat post direction to further increase (namely up to double) the circumferential compression resistance of the tube. Between the clamping zone and the connection to the saddle, the ribs are helicoidally oriented at ±45° to increase the resistance to (i) local buckling of the tube wall and (ii) cross-sectional collapse of the same tube. Also, some ribs aligned with post axis are unevenly distributed over the diameter in order to have different bending properties in length or transverse direction. A schematic of the concept is shown in FIGS. 9a and 9b. The composite is preferentially composed of combination of flax fibres, carbon fibres, and either a thermoset resin (such as epoxy), or a thermoplastic polymer such as Poly(lactic acid) (PLA), Poly(propylene) (PP), or any type of Poly(amide) (PA). The thickness of both the outside wall and the ribs at the inside, range between 1 and 3 mm, respectively.

The seat post designed using the present invention offers an optimum combination of structural design with a minimum amount of material (thus weight), while using the intrinsically high damping properties of the flax fibres.

The whole pole could be produced from a tubular fabric, produced like a knitted sock from thin fibres A, by stitching ribs made of thicker ribs B on the inner side of this tube or by using a second braided or knitted sock of spaced thicker ribs B forming a tubular grid and by placing the reinforced fabric within a female mould, impregnating the fabric with a resin or polymer, and applying pressure against the hot mould with an inflatable bladder.

FIG. 9b illustrates another embodiment of seat post, comprising all the elements of the seat post of FIG. 9a, and a few additional longitudinal stiffeners extending along the whole length of the inner side of the seat post.

Example 2: Bicycle and Motorcycle Saddle Sheet

FIG. 10 illustrates another embodiment of a product according to the invention. The product 1 in this example is a bicycle saddle. A bicycle saddle, often called a seat, is one of three contact points on an upright bicycle, the others being the pedals and the handlebars. It performs a similar role as a horse's saddle, not bearing all the weight of the rider as the other contact points also take some of the load.

The saddle sheet is the part directly in contact with the bottom of the cyclist. Today, saddle sheets are made from injection moulded polymer, metallic sheets or carbon fibre composites.

As an interface to the human body, the saddle sheet has a major function of comfort without adding unnecessary weight to the bicycle, and should not dissipate unnecessary energy by being too soft in specific parts of the sheet. Thus, it is a curved surface with zones of different flexural properties for an optimum combination of comfort (softer zones), support and efficiency (stiffer zones). In combination with the seat post, it is often used to damp the vibration transmitted from the bicycle frame to the body of the cyclist.

The technology disclosed herein is used to address these specifications: the outer shell at the interface with the human body is kept relatively thin, while zones requiring higher stiffness are reinforced by ribs placed underneath the saddle sheet.

The top layer 10 of the sheet consists of a laminate (a layup of several layers of lamina) with fibre layers oriented at 0°, at ±45° and at 90° to the bicycle axis. The orientation of the rib structure 11 on the lower surface of the saddle sheet is determined such to account for the local flexural property distribution throughout the saddle.

A schematic of the concept is shown in FIG. 10. The composite is preferentially composed of combination of flax fibres and either a thermoset resin (such as epoxy), or a thermoplastic polymer such as Poly(lactic acid) (PLA), Poly(propylene) (PP), or any type of Poly(amide) (PA). The thickness of both the outside wall and the ribs at the inside, range between 0.5 and 3 mm, respectively.

The saddle sheet designed using the present invention offers an optimum combination of structural design with a minimum amount of material (thus weight), while using the intrinsically high damping properties of the flax fibres.

Example 3: Bicycle Frame

FIG. 11 illustrates another embodiment of a product according to the invention. The product 1 in this example is a bicycle frame. A bicycle frame is the main component of a bicycle, on to which wheels and other components are fitted. The modern and most common frame design for an upright bicycle is based on the safety bicycle, and consists of two triangles, a main triangle and a paired rear triangle. This is known as the diamond frame. Today, bicycle frames are generally tubular, and are made from steel, aluminium, titanium, or carbon fibre composites.

The bicycle frame is the main structural part of the bicycle, transferring the energy generated by the cyclist through the bicycle into the wheels. The cross-section of the bicycle frame tubes made from the technology disclosed herein is similar to the one shown in FIG. 7b, where the outer layer 10 of the tube consists of a laminate (a layup of several layers of lamina) with a significant portion of the fibre layers oriented at 0° (parallel to the bicycle axis) to resist the compression and the flexural stresses, as well as layers comprising fibres at ±45° to withstand torsional efforts. In one version of the invention, the inner rib structure 11 is helicoidally oriented at ±45° to increase the resistance to (i) local buckling of the tube wall and (ii) cross-sectional collapse of the same tube. Alternatively, ribs are oriented at 0° (parallel to the bicycle axis) in zones where the wall is locally exposed to compression stresses. The cross-section of such a tube would look like the one shown in FIG. 7a. A schematic of the concept is shown in FIG. 11. The composite is preferentially composed of combination of flax fibres and either a thermoset resin (such as epoxy), or a thermoplastic polymer such as Poly(lactic acid) (PLA), Poly(propylene) (PP), or any type of Poly(amide) (PA). It may also be combined with carbon fibres to increase stiffness performances. The thickness of both the outside wall and the ribs at the inside, range between 0.5 and 4 mm, respectively.

The bicycle frame designed using the present invention offers an optimum combination of structural design with a minimum amount of material (thus weight), while using the intrinsically high damping properties of the flax fibres.

The invention could also be applied to other parts for bicycle, including handle bars made from one non-linear tube.

Example 4: Baseball Bat

FIGS. 12a and 12b illustrate other embodiments of a product according to the invention. The product 1 in this example is a baseball bat used in the game of baseball to hit the ball after the ball is thrown by the pitcher. It is no more than 69.85 mm in diameter at the thickest part and no more than 1067 mm in length. It typically weighs no more than 1 kg. The bat is a complex object, which is carved or constructed very carefully to allow for a quick, balanced swing while providing power. The bat is divided into several regions. The barrel is the thick part of the bat, where the bat is meant to hit the ball. The part of the barrel best for hitting the ball, according to construction and swinging style, is often called the sweet spot. The end of the barrel is not part of the sweet spot, and is simply called the tip or end of the bat. The barrel narrows, and becomes the handle. The bat is traditionally made from massive wood. However, hollow metal or composite bat have become very popular in recent years due to their low weight and high durability.

The cross-section of a club made from the technology disclosed herein may be similar to the one shown in FIG. 7b, where the outer layer of the tube consists of a laminate (a layup of several layers of lamina) with similar amounts of fibre layers oriented at 0° and at ±45. While the presence of the ribs does not add significant value at the level of the handle, the inner rib structure is preferentially helicoidally oriented at ±45° or less to increase the resistance to local buckling of the club wall when impacted with the ball. A schematic of the concept is shown in FIG. 12. The composite is preferentially composed of combination of flax fibres and either a thermoset resin (such as epoxy), or a thermoplastic polymer such as Poly(lactic acid) (PLA), Poly(propylene) (PP), or any type of Poly(amide) (PA). It may also be combined with carbon fibres to increase stiffness performances. The thickness of both the outside wall and the ribs at the inside, range between 1 and 3 mm, respectively.

The baseball bat designed using the present invention offers an optimum combination of structural design with a minimum amount of material (thus weight), while using the intrinsically high damping properties of the flax fibres.

Example 5: Legs of Furniture, Such as Tables or Chairs

Furniture legs mainly need to withstand compression resulting from a combination of dead load generated by the table surface they are supporting, and life loads resulting from objects that are placed on- and removed from the table. The legs have also to withstand bending loads when lateral efforts are applied, for example when the piece of furniture is slit on the floor.

The cross-section of a hollow furniture leg made from the technology disclosed herein is similar to the one shown in FIG. 7b, where the outer layer of the tube consists of a laminate (a layup of several layers of lamina) with fibre layers mainly oriented at 0° to resist the compression, and some containing fibres oriented at 90° to keep the fibres at 0° together. In one version of the invention, the inner rib structure is helicoidally oriented at ±45° to increase the resistance to (i) local buckling of the tube wall and (ii) cross-sectional collapse of the same tube. The orientation of the inner rib structure may also vary to include ribs oriented at 90° to the leg direction in cases where the leg is clamped into another part of the table. The composite is preferentially composed of combination of flax fibres and either a thermoset resin (such as epoxy), or a thermoplastic polymer such as Poly(lactic acid) (PLA), Poly(propylene) (PP), or any type of Poly(amide) (PA). The thickness of both the outside wall and the ribs at the inside, range between 0.5 and 3 mm, respectively.

The furniture leg designed using the present invention offers an optimum combination of structural design with a minimum amount of material (thus weight).

Example 6: Lightweight Chair Backrest

Figure 13A:
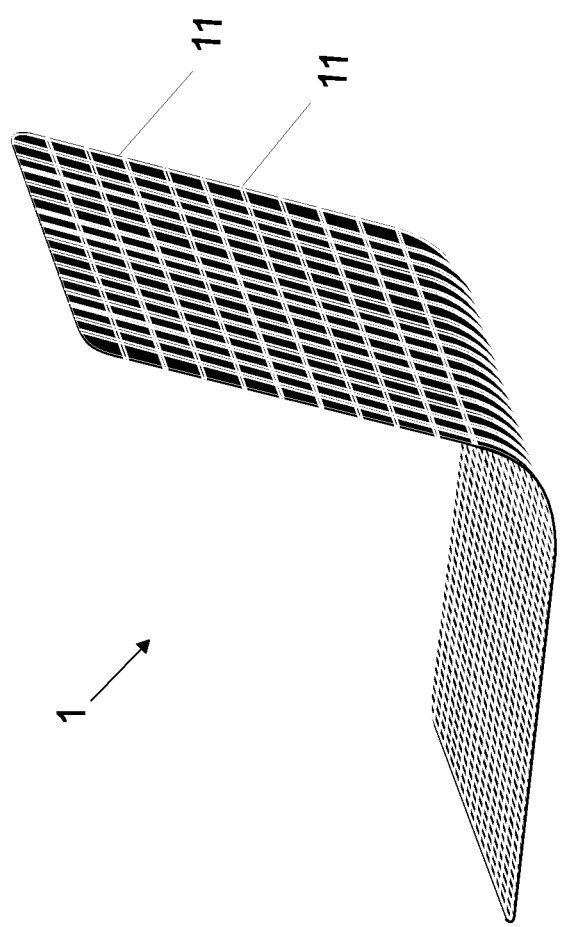
FIGS. 13a and 13 illustrate examples of pieces of furniture, here a chair, produced with the method of the invention.
Figure 13B:
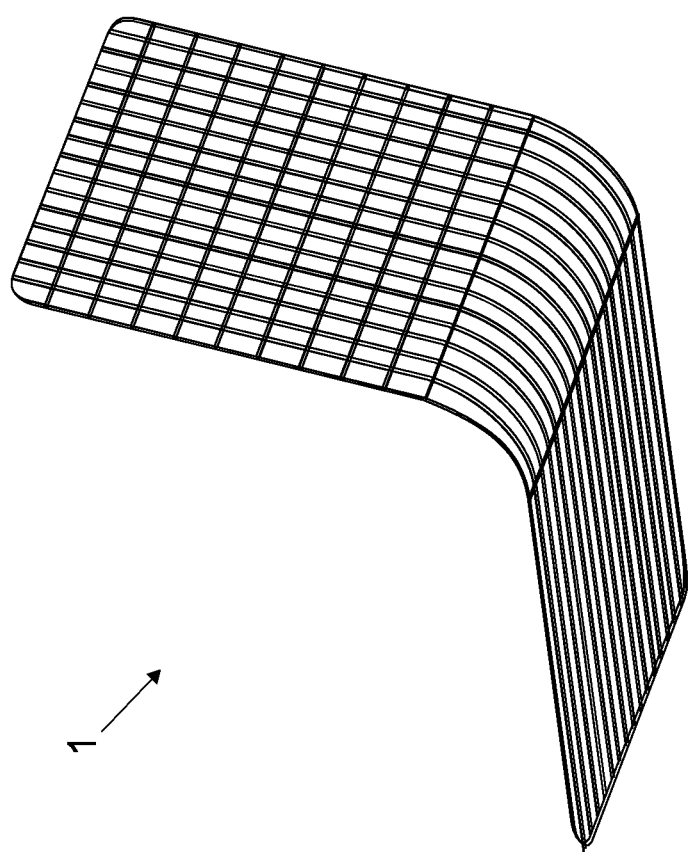

FIGS. 13a and 13b illustrate other embodiments of a product according to the invention. The product 1 in this example is a chair backrest. A chair backrest mainly needs to withstand flexural loading resulting from the chair user leaning back, as well as some compression when people use it as a support.

Using the disclosed technology, a chair backrest with an optimum weight-to-performance ratio made from natural fibre composites may be designed. The top layer of the sheet consists of a laminate (a layup of several layers of lamina) with fibre layers oriented at 0°, at ±45° and at 90° to the bicycle axis. The ribs on the back side of the sheet are mainly oriented in the vertical (0°) direction to withstand flexural loads A schematic of the concept is shown in FIGS. 13a and 13b. The composite is preferentially composed of combination of flax fibres and either a thermoset resin (such as epoxy), or a thermoplastic polymer such as Poly(lactic acid) (PLA), Poly(propylene) (PP), or any type of Poly(amide) (PA). The thickness of both the outside wall 10 and the ribs 11 at the inside, range between 0.5 and 3 mm, respectively.

The backrest designed using the present invention offers an optimum combination of structural design with a minimum amount of material (thus weight).

Example 7: Flat/Curved Sheets for Automotive Applications

Cutting weight and increasing the content of bio-based and recyclable materials in vehicular structures constitute the major challenges of today's automotive industry, since it is directly linked to reducing the vehicle's consumptions both during all the steps of its life cycle. In this context, natural fibre composites are expected to play an important role, and the present technology further improves the structural efficiency of natural fibre composites parts. Several so-called semi- or secondary structural parts, such as backrests or roofs of various vehicles (car, van, bus etc.) or side panels in camping cars or utility vehicles may be composed of panels made from the disclosed technology.

The composite is preferentially composed of combination of flax fibres and either a thermoset resin (such as epoxy), or a thermoplastic polymer such as Poly(lactic acid) (PLA), Poly(propylene) (PP), or any type of Poly(amide) (PA). The thickness of both the outside wall and the ribs at the inside, range between 0.5 and 3 mm, respectively.

Example 8: Paddle

Paddles commonly used in canoes consist of a wooden, glass fibre, carbon fibre or metal rod (the shaft) with a handle on one end and a rigid sheet (the blade) on the other end. Paddles for use in kayaks are longer, with a blade on each end; they are handled from the middle of the shaft. More recently, so-called stand-up paddling (SUP), which consists of standing and paddling on a surfboard, has become very popular.

Both the shaft and the blade have to withstand bending occurring when the paddle is drawn through the water from front (bow) to back (stern) in order to efficiently transfer the forces from the paddle through the paddler into the boat.

Figure 14A:
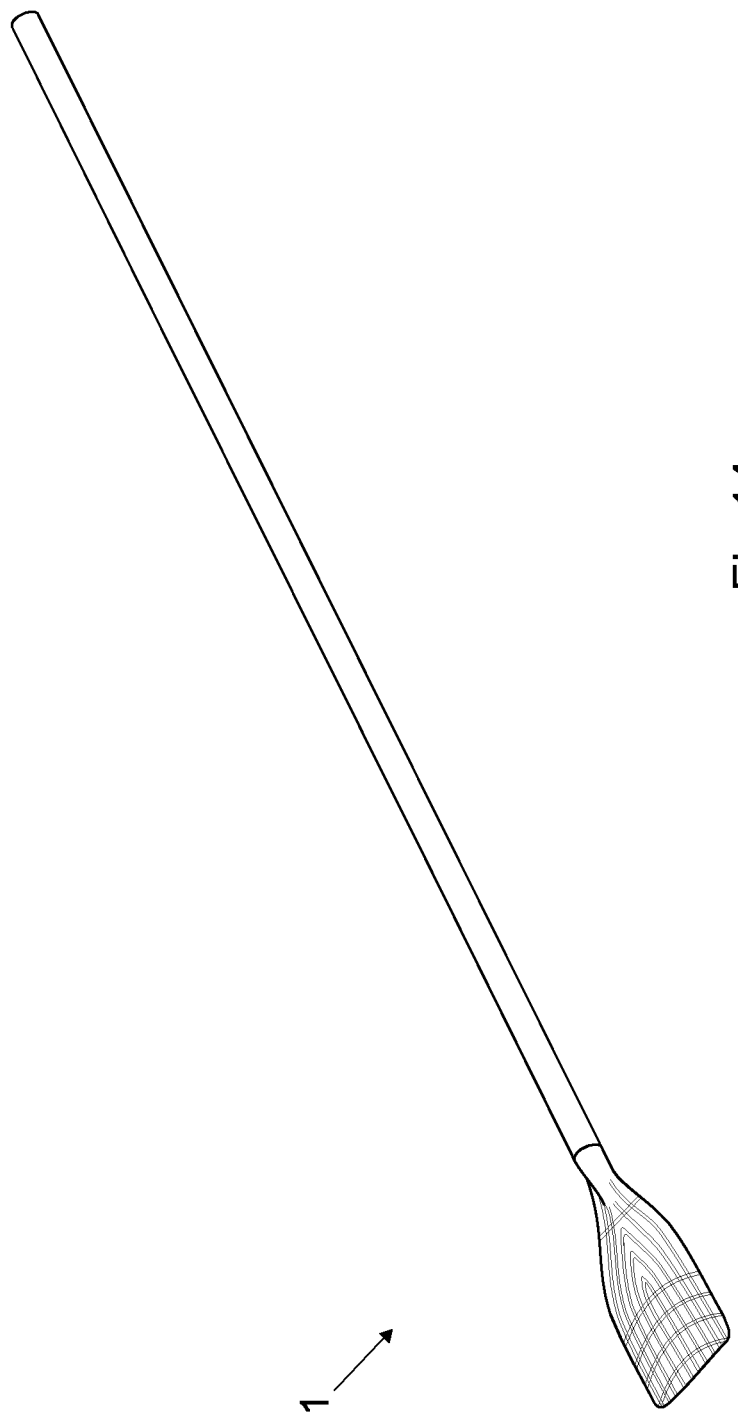
FIGS. 14a to 14c illustrate three different views over a paddle according to the invention.
Figure 14B:
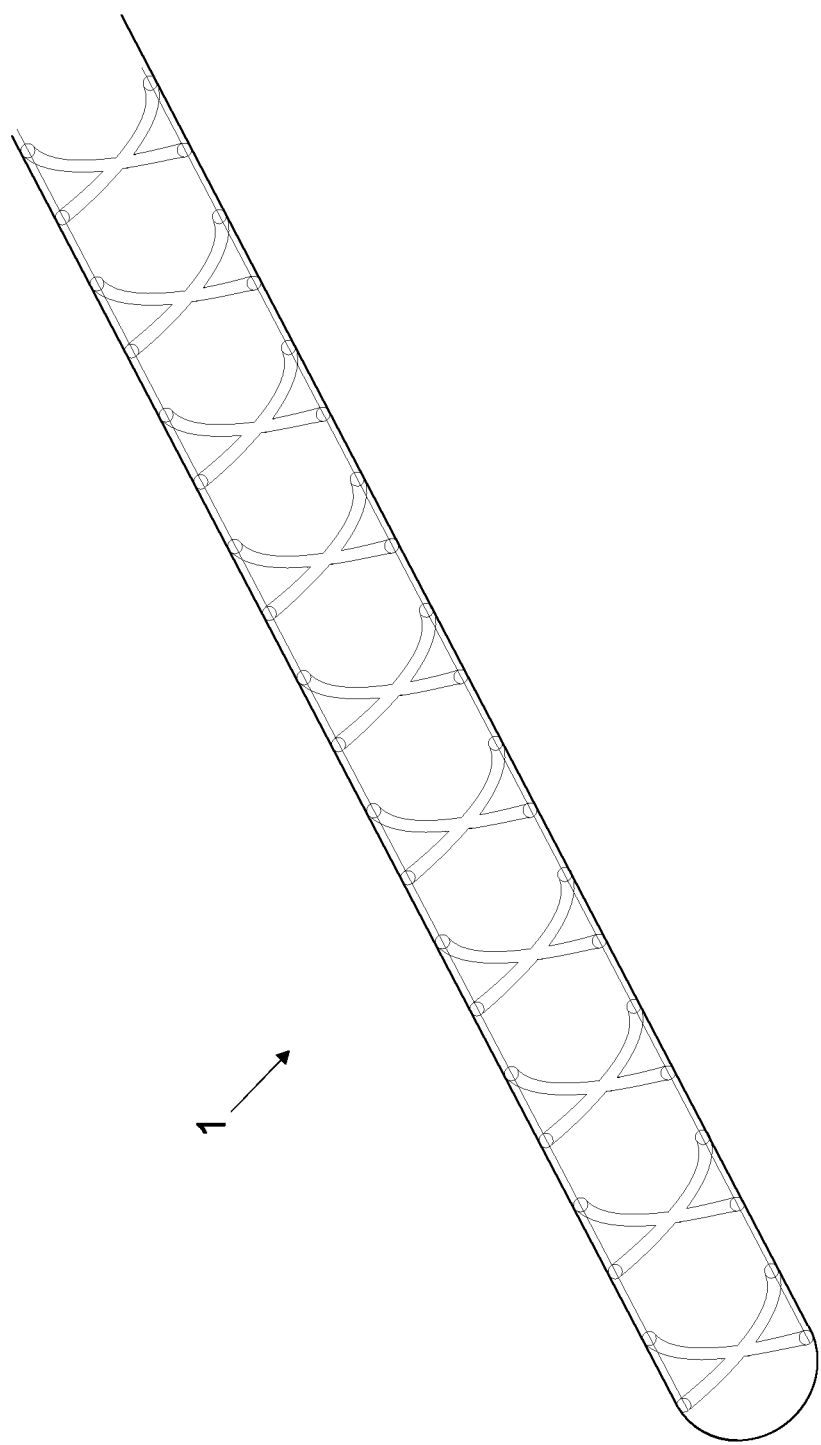
Figure 14C:
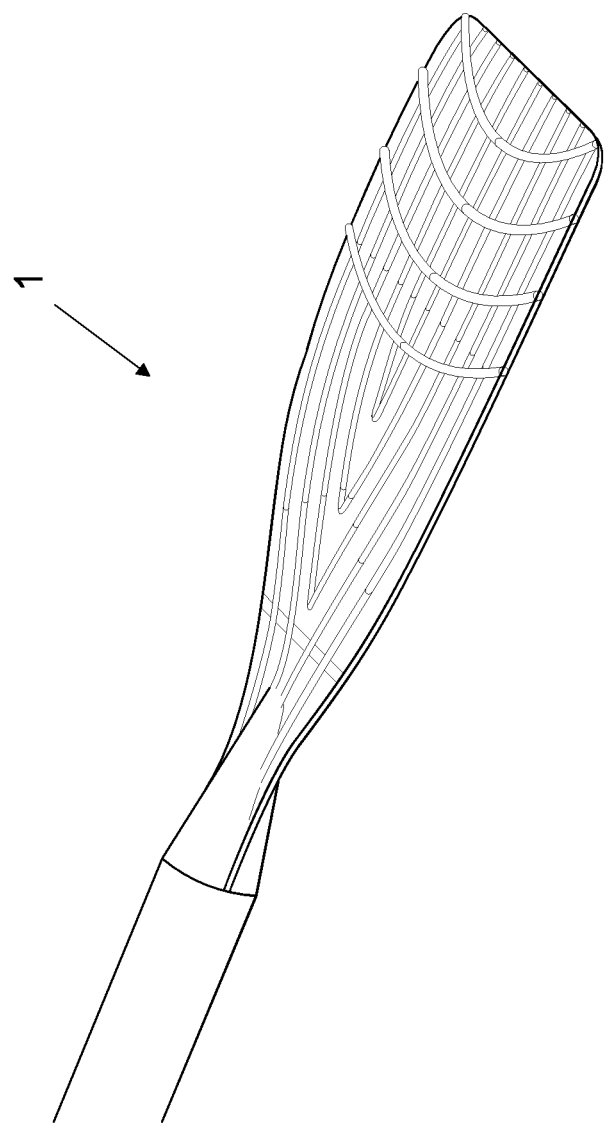

The cross-section of a paddle made from the technology disclosed herein is similar to the one shown in FIG. 7b, where the outer layer of the tube consists of a laminate (a layup of several layers of lamina) with fibre layers mainly oriented at 0° to resist bending, some containing fibres oriented at ±45° to withstand torsion, circumferential compression from the paddler's hands, and to keep the 0° fibres together. The ribs are helicoidally oriented at ±45° to increase the resistance to (i) local buckling of the tube wall and (ii) cross-sectional collapse of the same tube. The ribs on the blade are oriented at approximately 0°/90°. A schematic of the concept is shown in FIG. 14. The composite is preferentially composed of combination of flax fibres and either a thermoset resin (such as epoxy), or a thermoplastic polymer such as Poly(lactic acid) (PLA), Poly(propylene) (PP), or any type of Poly(amide) (PA). The thickness of both the outside wall 10 and the ribs 11 at the inside, range between 0.5 and 3 mm, respectively.

The paddle designed using the present invention offers an optimum combination of structural design with a minimum amount of material (thus weight), while using the intrinsically high damping properties of the flax fibres.

The invention could also be applied to other products, including without limitations ski or walking poles; etc.

The invention claimed is:

1. Composite product comprising:
   a thin walled structure having a thickness comprised between 0.5 mm and 3 mm, said structure comprising first fibre yarn and second fibre yarn,
   the second fibre yarn being fixed to the first fibre yarn to form the thin walled structure and increase the stiffness of said thin walled structure, said first fibre having a first thickness, and said second fibre yarns having a second thickness larger than said first thickness,
   wherein second fibres of the second fibre yarns are selected among flax, hemp, jute, ramie, kenaf, sisal, henequen, bamboo, or silk, said second fibre yarns comprising said second fibres twisted,
   wherein one first layer has only first fibre yarns while one second layer comprises at least some second fibre yarns, or wherein one single layer comprises first fibre yarns and second fibre yarns which are flush on one side, so that at least one side of said product is even.

2. The product of claim 1, wherein said second layer consists of spaced fibre yarns.

3. The product of claim 1, wherein said second layer additionally comprises third fibres with a thickness inferior to said second thickness.

4. The product of claim 1, wherein said second layer comprises a repeating sequence of second natural fibre yarns with first or third fibre yarns.

5. The product of claim 4, wherein said second layer comprises a repeating sequence of ABABABA or AABAABAAB or AAABAAABAAAB, wherein A indicates said first fibre yarn and B indicates said second fibre yarn.

6. The product of claim 1, wherein each second fibre yarn in said second layer has said second thickness.

7. The product of claim 1, wherein said first fibre yarns are of a first fibre type and said second fibre yarns are of a second fibre type.

8. The product of claim 1, wherein said second fibres are used as ribs for reinforcing the stiffness of the product, and wherein the total weight of said second fibres is comprised between 3 and 50% of the total weight of said first fibres.

9. The product of claim 1, wherein said second fibre yarns are fixed to said first fibre yarns by stitching, gluing, adhesive bonding, weaving, knitting, or braiding.

10. The product of claim 1, wherein at least one of said layer comprises carbon fibres.

11. The product of claim 1, having the structure of a hollow cylinder.

12. The product of claim 1, being one among:
   a seat post;
   a bicycle saddle;
   a bicycle frame;
   a bicycle handle bar;
   a baseball bat;

a piece of furniture;
a paddle; or
a sheet for automotive applications.

13. The product of claim 1, wherein said second layer additionally comprises third fibres with a thickness inferior to said second thickness and wherein said second layer comprises a repeating sequence of second natural fibre yarns with third fibre yarns.

14. The product of claim 13, wherein said second fibre yarns are stitched with at least one of said first and third fibre yarns.

15. The product of claim 1, wherein the composite is a tube.

16. The product of claim 1, wherein the composite is a flat sheet.

17. The product of claim 1, wherein the composite is has a curved surface.

18. Composite product comprising:
a thin walled structure having a thickness comprised between 0.5 mm and 3 mm, said structure comprising first fibre yarn and second fibre yarn,
the second fibre yarn being fixed to the first fibre yarn to form the thin walled structure and increase the stiffness of said thin walled structure, said first fibre yarns having a first thickness, and said second fibre yarns having a second thickness larger than said first thickness,
wherein second fibres of the second fibre yarns are selected among flax, hemp, jute, ramie, kenaf, sisal, henequen, bamboo, or silk, said second fibre yarns comprising said second fibres twisted,
wherein one first layer has only first fibre yarns while one second layer comprises at least some second fibre yarns, or wherein one single layer comprises first fibre yarns and second fibre yarns which are flush on one side, so that at least one side of said product is even,
wherein said second fiber yarn is used as ribs for reinforcing the stiffness of the composite product the product comprises at least 5% by weight of parallel ribs or at least 10% by weight of criss-crossing ribs.

19. The product of claim 18, wherein the composite is a tube.

20. The product of claim 18, wherein the composite is a flat sheet.

21. The product of claim 18, wherein the composite is has a curved surface.

22. Composite product comprising
a thin walled having a thickness comprised between 0.5 mm and 3 mm, said structure comprising first fibre yarn and second fibre yarn,
the second fibre yarn being fixed to the first fibre yarn to form the thin walled structure and locally increase the stiffness of said thin walled structure, said first fibre yarns having a first thickness, and said second fibre yarns having a second thickness larger than said first thickness,
wherein second fibres of the second fibre yarns are selected among flax, hemp, jute, ramie, kenaf, sisal, henequen, bamboo, or silk, said second fibre yarns comprising said second fibres twisted,
wherein one first layer has only first fibre yarns while one second layer comprises at least some second fibre yarns, or wherein one single layer comprises first fibre yarns and second fibre yarns which are flush on one side, so that at least one side of said product is even,
the composite further comprising a thermoplastic polymer or a thermoset resin as a matrix linking the fibre yarns and increasing the stiffness of the product.

23. The product of claim 22, wherein at least said second fiber yarn are impregnated by said polymer or resin, said impregnated second fiber yarn being used as ribs for reinforcing the stiffness of the product.

24. The product of claim 22, wherein said second fiber yarn and said first fiber are impregnated by said polymer or resin for reinforcing the stiffness of the product.

25. The product of claim 22, wherein the thermoplastic polymer is chosen amongst Poly(lactic acid) (PLA), Poly(propylene) (PP), or any type of Poly(amide) (PA).

26. The product of claim 22, wherein the thermoset resin is an epoxy resin.

27. The product of claim 22, wherein the composite is a tube.

28. The product of claim 22, wherein the composite is a flat sheet.

29. The product of claim 22, wherein the composite is has a curved surface.

30. Composite product comprising:
a thin walled structure having a thickness comprised between 0.5 mm and 4 mm, said structure comprising first fibre yarn and second fibre yarn,
the second fibre yarn being fixed to the first fibre yarn to form the thin walled structure and locally increase the stiffness of said thin walled structure, said first fibre having a first thickness, and said second fibre yarns having a second thickness larger than said first thickness,
wherein second fibres of the second fibre yarns are selected among flax, hemp, jute, ramie, kenaf, sisal, henequen, bamboo, or silk, said second fibre yarns comprising said second fibres twisted,
wherein one first layer has only first fibre yarns while one second layer comprises at least some second fibre yarns, or wherein one single layer comprises first fibre yarns and second fibre yarns which are flush on one side, so that at least one side of said product is even.

* * * * *